(12) United States Patent
Nossik et al.

(10) Patent No.: US 9,021,264 B2
(45) Date of Patent: Apr. 28, 2015

(54) METHOD AND SYSTEM FOR CLOUD BASED STORAGE

(75) Inventors: Misha Nossik, Ottawa (CA); Razvan Dumitrescu, Ottawa (CA); Lejin Du, Ottawa (CA); Zhengping You, Ottawa (CA); Yuri Berfeld, Ottawa (CA)

(73) Assignee: Cloudlink Technologies Inc., Ottawa (CA)

( * ) Notice: Subject to any disclaimer, the term of this patent is extended or adjusted under 35 U.S.C. 154(b) by 333 days.

(21) Appl. No.: 13/365,768

(22) Filed: Feb. 3, 2012

(65) Prior Publication Data

US 2012/0204030 A1 Aug. 9, 2012

Related U.S. Application Data

(60) Provisional application No. 61/439,244, filed on Feb. 3, 2011.

(51) Int. Cl.
*H04L 29/06* (2006.01)
*H04L 9/08* (2006.01)
*G06F 9/455* (2006.01)
*G06F 21/62* (2013.01)

(52) U.S. Cl.
CPC ............ *H04L 9/0891* (2013.01); *H04L 9/0822* (2013.01); *H04L 9/0897* (2013.01); *G06F 9/45558* (2013.01); *G06F 2009/45579* (2013.01); *G06F 2009/45587* (2013.01); *G06F 21/6218* (2013.01)

(58) Field of Classification Search
CPC .. H04L 9/0822; H04L 9/0816; G06F 21/6218
USPC ........................ 713/155, 168; 718/1
See application file for complete search history.

(56) References Cited

U.S. PATENT DOCUMENTS

| | | | |
|---|---|---|---|
| 2008/0155169 A1* | 6/2008 | Hiltgen et al. | 711/6 |
| 2009/0300719 A1* | 12/2009 | Ferris | 726/3 |
| 2010/0198730 A1* | 8/2010 | Ahmed et al. | 705/50 |
| 2010/0333116 A1* | 12/2010 | Prahlad et al. | 719/328 |
| 2011/0022574 A1* | 1/2011 | Hansen | 707/698 |
| 2011/0022642 A1* | 1/2011 | deMilo et al. | 707/805 |
| 2011/0022812 A1* | 1/2011 | van der Linden et al. | 711/163 |
| 2011/0107103 A1* | 5/2011 | Dehaan et al. | 713/171 |
| 2012/0072716 A1* | 3/2012 | Hu et al. | 713/156 |
| 2012/0110328 A1* | 5/2012 | Pate et al. | 713/165 |
| 2012/0140923 A1* | 6/2012 | Lee et al. | 380/45 |

\* cited by examiner

*Primary Examiner* — Chau Le
(74) *Attorney, Agent, or Firm* — Shapiro Cohen LLP

(57) ABSTRACT

A method is disclosed wherein a first virtual machine is provided in execution. A storage area network for storing of data of the first virtual machine is also provided. A second virtual machine is executed for receiving first data from the first virtual machine for storage within the storage area network and for securing the first data to form secured first data and for storing the secured first data within the storage area network.

21 Claims, 5 Drawing Sheets

METHOD AND SYSTEM FOR CLOUD BASED STORAGE

FIELD OF THE INVENTION

The invention relates to cloud based computing and more particularly to a method and system for securely storing data within a multitenancy environment.

BACKGROUND

Cloud computing is a field of research that aims to move processing resource management from within each enterprise into a wide area network (WAN) such as the Internet. When implemented, a user or enterprise has similar services and software but the processing for those is at least partially performed outside the user's system or the enterprise—within the cloud.

Some fundamental concepts of cloud based computer include mutitennacy, where a single system is in execution of software relating to a plurality of different and distinct clients. Different from typical server applications, where each client has a defined server that they use—client server operations, and wherein one server serves data to multiple clients, in multitenancy one server system executes software and stores data for many different clients appearing as a single different server to each. This is achieved through the execution of virtual machines, each virtual machine virtualising a processing system.

Another fundamental concept of cloud based computing is that a location in the cloud where the virtualisation occurs is not significant. To this end, virtualising systems often comprise numerous processing systems and numerous storage systems all in communication one with another. Further, any of the physical underlying hardware can be upgraded, changed, moved, replaced, combined, etc. as technology, business needs, and the cloud system may require. Thus, a virtual machine in execution on a first physical system today may be executed on a second other physical system tomorrow. Further, data stored within a first storage medium today may be stored within a second other storage medium tomorrow.

Secure multitenancy is a problem because data is accessible to each and every physical system through a storage area network (SAN). Presently, virtualising software for forming virtual machines blocks access to data outside said virtual machine. Thus, "tenants" in a multitenancy cannot see data of other tenants because the software prevents this. The software relies on policies and policy implementations to determine data that can or cannot be shared.

Unfortunately, any policy-based security is inherently problematic. One erroneous policy or bug could leave all the data within a SAN available to all tenants. Further, an administrator who sets policies has access to all the data within the SAN.

Presently, the only way to solve this problem is by ciphering of data. For example, when a multitenancy system is used for data backup and restore, data being backed up is encrypted at the client and transmitted via the WAN to a storage medium within the cloud. Upon retrieving the data, the client decrypts same and then has access to it. Of course, the data is completely unusable until decrypted and therefore is not usable within the cloud.

Other methods require the installation of a hardware device for each tenant seeking security and as such are not scalable, portable, or as is desirable in cloud computing systems, ubiquitous. Thus, with cloud computing steering away from custom hardware solutions for a single application for a single user—as is obviously undesirable—policy based security remains the most common approach.

It would be advantageous to provide an improved method of secure multitenancy.

SUMMARY OF EMBODIMENTS OF THE INVENTION

In accordance with embodiments of the invention there is provided a method comprising: providing a first virtual machine in execution; providing a storage area network for storing of data of the first virtual machine; and providing a second virtual machine for receiving first data from the first virtual machine for storage within the storage area network and for securing the first data to form secured first data and for storing the secured first data within the storage area network.

In accordance with another embodiment of the invention there is provided a method comprising: providing a first process in execution within an enterprise and for storing of data; providing a second process in execution within the enterprise for communicating with a cloud based service; providing third process within the cloud for receiving backup data from the second process for storage within the cloud; and a fourth process within the cloud for receiving the backup data and for securing the backup data for storage and for providing the secured backup data to a storage area network for storage thereof.

In accordance with another embodiment of the invention there is provided a method comprising: providing a first process in execution within an enterprise and for storing of data; providing a second process in execution within the enterprise for communicating with a cloud based service; providing third process within the cloud for receiving backup data from the second process for processing within the cloud; providing a fifth process within the cloud for receiving the backup data and for processing thereof and for providing the processed backup data; and providing a fourth process within the cloud for receiving the processed backup data and for securing the backup data for storage and for providing the secured backup data to a storage area network for storage thereof.

In accordance with another embodiment of the invention there is provided a method comprising: providing a first process in execution within an enterprise and for storing of data; providing a second process in execution within the enterprise for communicating with a cloud based service; providing a third process within the cloud for receiving backup data from the second process for processing within the cloud; providing a fifth process within the cloud for receiving the backup data and for providing the backup data; and providing a fourth process within the cloud for receiving the backup data from the fifth process and for securing the backup data for storage and for providing the secured backup data to a storage area network for storage thereof.

In accordance with another embodiment of the invention there is provided a system comprising a cloud based processor and a cloud based storage area network, the cloud based processor for executing a first virtual machine for securing data for being stored within the storage area network; and an enterprise processor for interfacing with a key manager and for authenticating the first virtual machine in order to one of enable provision of encryption key data thereto or deny provision of encryption key data thereto.

In accordance with another embodiment of the invention there is provided a method comprising: providing a first virtual machine in execution; providing a storage area network for storing of data of the first virtual service; and providing a second virtual machine for receiving first data from the first virtual machine for storage within the storage area network and for securing the first data to form secured first data and for storing the secured first data within the storage area network.

In accordance with another embodiment of the invention there is provided a method comprising: providing a first virtual service in execution; providing a storage area network for storing of data of the first virtual service; and providing a second virtual service for receiving first data from the first virtual service for storage within the storage area network and for securing the first data to form secured first data and for storing the secured first data within the storage area network.

BRIEF DESCRIPTION OF THE DRAWINGS

The features and advantages of the invention will become more apparent from the following detailed description of the preferred embodiment(s) with reference to the attached figures, wherein.

It is noted that in the attached figures, like features bear similar labels.

DETAILED DESCRIPTION OF EMBODIMENTS OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the scope of the invention. Thus, the present invention is not intended to be limited to the embodiments disclosed, but is to be accorded the widest scope consistent with the principles and features disclosed herein.

The term vNode as used herein refers to a virtualized node and is typically implemented as a virtual machine. vNodes often couple to networks and between other communicating objects acting as intelligent nodes in a communication path. The term sNode as used herein refers to a virtualized node coupled between a virtual machine and a SAN. Typically, an sNode is implemented as a virtual machine or as part of a virtual machine.

Though there are many applications for secure multitenancy, the example given hereinbelow for facilitating understanding of the invention relates to disaster recovery relying on the cloud.

Figure 1:
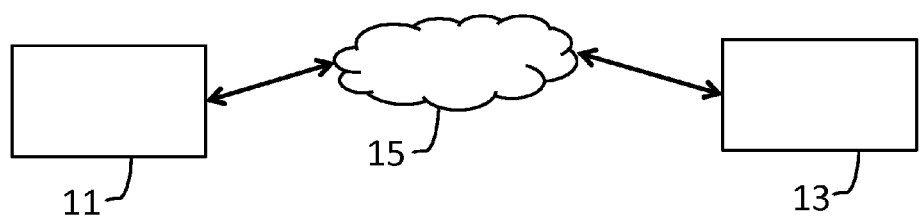
FIG. 1 is a simplified network diagram.

Referring to FIG. 1, shown is a simplified diagram of a simplified enterprise duplicate server setup. Server 11 and duplicate server 13 have identical hardware and software configurations and are situated at disparate locations, for example in Boston and in San Jose, respectively. An IT team in Boston maintains the server 11 while another IT team in San Jose maintains the duplicate server 13. A data connection in the form of Internet 15 between the server 11 and the duplicate server 13 allows for data on the server 11 to be duplicated to the duplicate server 13, at intervals. If during one such interval a catastrophe occurs causing server 11 to fail irreparably, then only new data during the interval is lost. Thus a shorter interval results in a lesser maximum amount of data that is losable. Conversely, a shorter interval results in more data transfer across the Internet to duplicate the data from server 11 to the duplicate server 13.

When the server 11 is unavailable, the server 13 takes over its functions and, as such, the time that the servers in aggregate are not in operation can be very small and optimally is short enough to prevent any business losses due to server inactivity.

Figure 2:
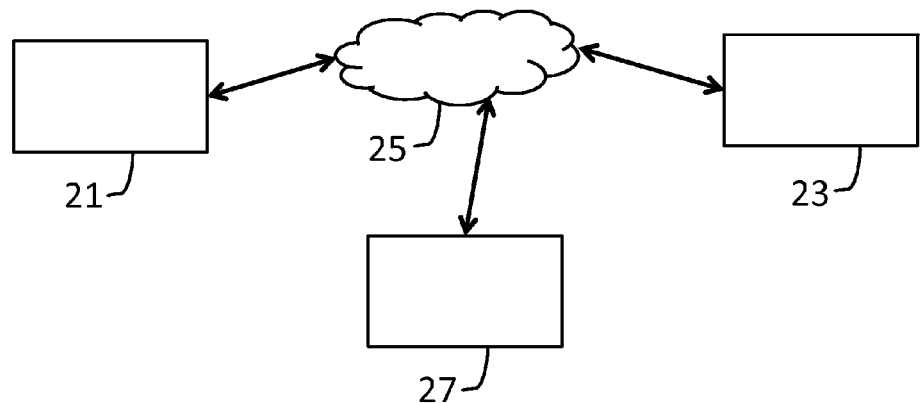
FIG. 2 is another simplified network diagram.

Referring to FIG. 2, shown is a simplified block diagram of another system for providing data back up and recovery. Here a host computer 21 includes a set of data storage processes thereon. For example, files are stored, accounting data is stored, emails are stored, etc. At intervals the host computer 21 transmits file data via a network in the form of the Internet 25 to a backup server 23 where the data is stored—backed up. Typically, the data is backed up in a compressed form. Optionally, the data is backed up in a secured form.

When the host computer 21 fails, a new host computer 27 is selected or set up and the backed up data on the backup server 23 is retrieved via the Internet 25 and provided to the new host computer 27. The data is reset in its original form, for example by decompressing the data or by reconstituting the data when it is stored as incremental changes and stored on the new host computer 27. Once reconstituted, the data is again accessible using the new host computer 27 instead of the host computer 21. The time to retrieve and reconstitute the data is not insignificant and, as such, the data may be unavailable for considerable time. This method of data backup and recovery is well suited to task based consulting operations where a file is not immediately necessary but if lost would ideally be recoverable.

Figure 3:
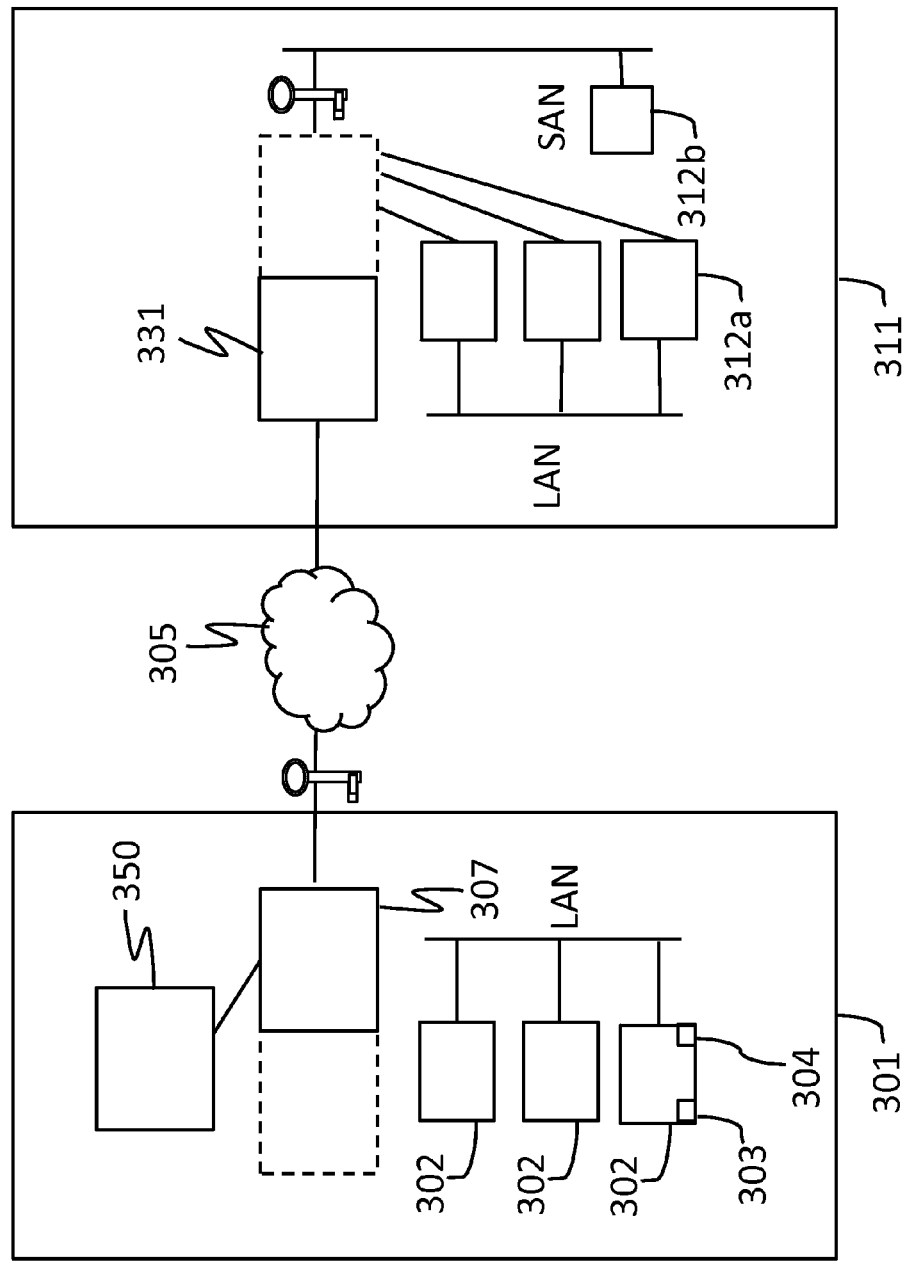
FIG. 3 is a simplified block diagram of a network secure storage.

Referring to FIG. 3, shown is a simplified block diagram of a system for supporting disaster recovery in a cloud based multitenancy system. An enterprise 301 is shown comprising a plurality of enterprise server systems 302. Each enterprise server system 302 comprises a software solution 303 and data 304 relating thereto. Of course a single system optionally includes multiple software solutions and datasets. The enterprise 301 is coupled via a WAN in the form of Internet 305 to a cloud processing provider 311. The cloud processing provider comprises a plurality of virtual machines 312a and virtual storage solutions 312b. Here, there is a different virtual machine 312a corresponding to each enterprise server system 302. Data for each virtual machine and the virtual machine itself is stored within the virtual storage solutions 312b, which is storage within the cloud. Unfortunately, the cloud storage is not necessarily within a specific machine or system and, therefore, unlike the duplicate servers of the prior art has no guarantee of security that is easily verifiable and enforceable.

Therefore, for the virtual machines 312a, at least a further virtual machine 331 is defined which is interposed between the virtual machine and the virtual storage 312b to provide cryptographic functions for encrypting the data prior to storage thereof and for decrypting data upon retrieval thereof. Thus, the virtual machine and its data are stored in a secure fashion, secured by virtual machine 331.

The virtual machine 331 is also coupled to the Internet 305 for communicating within the enterprise via a node 307 in the form of an enterprise virtual machine for secure communication with the virtual machine 331.

In use, an enterprise server system executes software. Data results are stored in a data set of the server and then provided to the node 307. The node 307 secures the data and provides same to the node 331 which de-secures the data and re-secures the data for storage within the virtual storage 312b. The associated virtual machine 312a optionally executes at intervals or uninterrupted providing access to a fully functional virtual machine with up-to-date data for replacing the enterprise server system. Unlike prior art approaches, the system is not inefficient as it is only allocated sufficient cycles for backup and testing functionality. That said, the virtual machine is always available in case of a required disaster recovery test. Further, the data within the offsite storage is secured both as a backup and when presently used for recovery.

Figure 4:
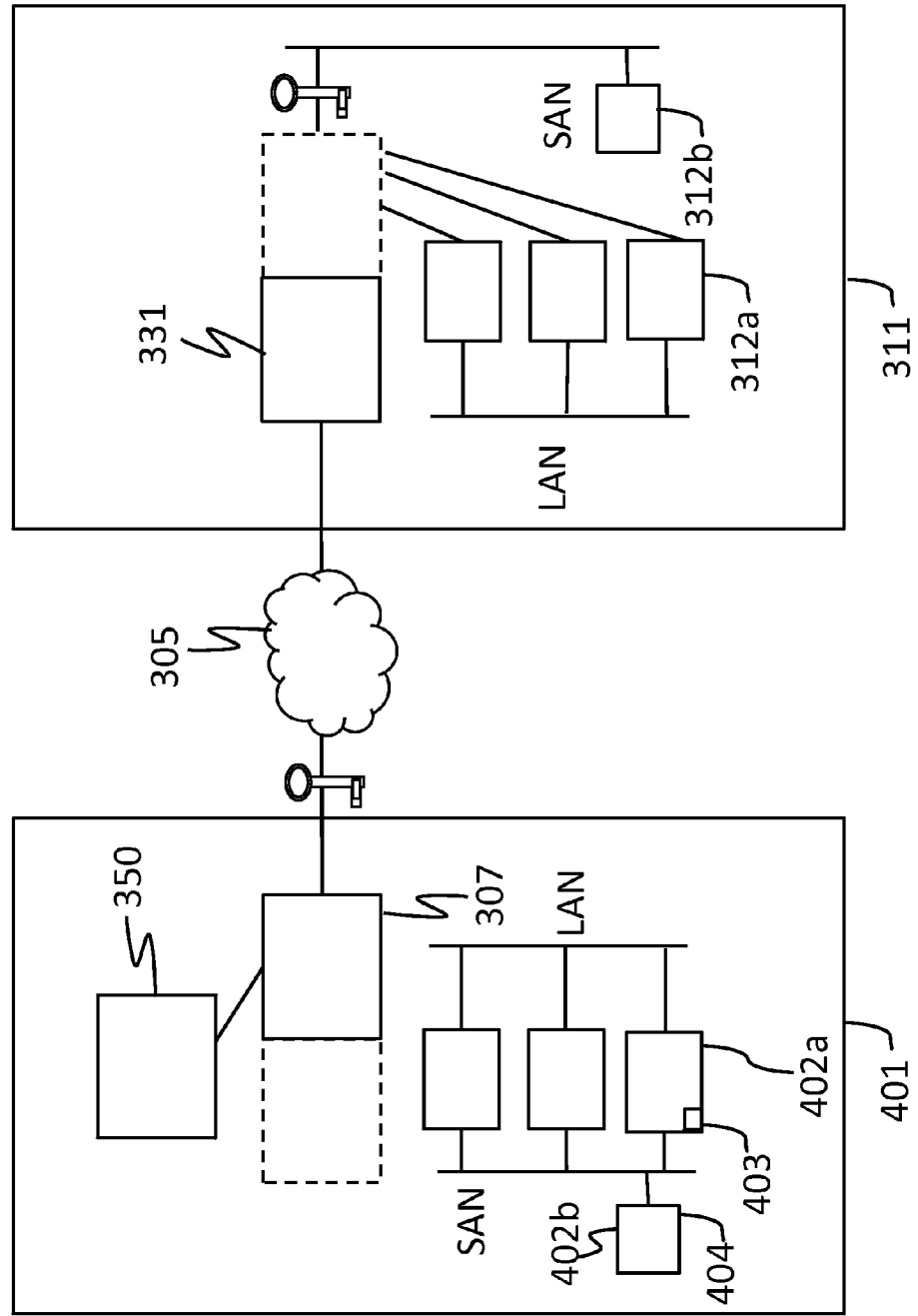
FIG. 4 is another simplified block diagram of a network secure storage.

Referring to FIG. 4, shown is a simplified block diagram of a system for cloud based backup for example for supporting disaster recovery. An enterprise 401 is shown comprising a plurality of enterprise virtual machines 402a with virtual data stores 402b. Each virtual machine 402a comprises a software solution 403 and each virtual data store 402b comprises data 404 stored therein relating to the software solution 403. Of course a single system optionally includes multiple software solutions and datasets. The enterprise 301 is coupled via a WAN in the form of Internet 305 to a cloud processing provider 311. The cloud processing provider comprises a plurality of virtual machines 312a and virtual storage solutions 312b. Here, there is a different virtual machine 312a corresponding to each virtual machine 402a. Data for each virtual machine 312a and the virtual machine itself is stored within the virtual storage solutions 312b, which is storage within the cloud. Unfortunately, the cloud storage is not necessarily within a specific machine or system and, therefore, unlike the duplicate servers of the prior art has no guarantee of security that is easily verifiable and enforceable.

Therefore, for the virtual machines 312a, at least a further virtual machine 331 is defined which is interposed between the virtual machine and the virtual storage 312b to provide cryptographic functions for encrypting the data prior to storage thereof and for decrypting data upon retrieval thereof. Thus, an image of the virtual machine and its data are stored in a secure fashion, secured by virtual machine 331.

The virtual machine 331 is also coupled to the Internet 305 for communicating within the enterprise via a node 307 in the form of an enterprise virtual machine for secure communication with the virtual machine 331.

In use, data results of the virtual machine 402a are provided to the node 307. The node 307 secures the data and provides same to the node 331 which de-secures the data and re-secures the data for storage within the virtual storage 312b. The associated virtual machine 312a optionally executes at intervals or uninterrupted providing access to a fully functional virtual machine with up to date data for replacing the enterprise server system. Unlike prior art approaches, the system is not inefficient as it is only allocated sufficient cycles for backup and testing functionality. That said, the virtual machine is always available in case of a required disaster recovery test. Further, the data within the offsite storage is secured both as a backup and when presently used for recovery.

Advantageously, the image of virtual machine 312a if completely decrypted is a functional duplicate of an image of virtual machine 402a, thereby providing backup and execution functionality, simultaneously.

Figure 5:
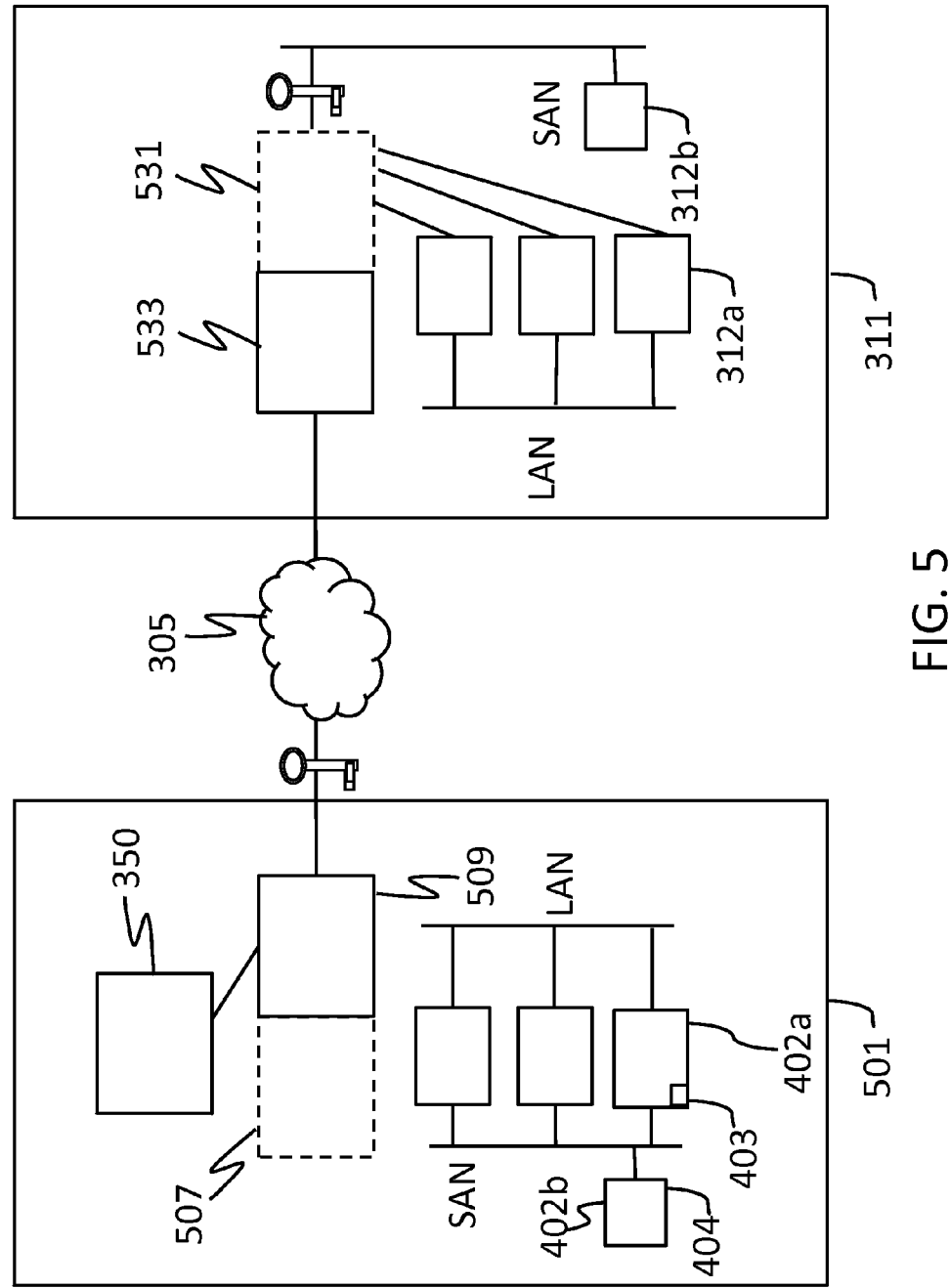
FIG. 5 is another simplified block diagram of a network secure storage.

Referring to FIG. 5, shown is a simplified block diagram of a system for cloud-based backup for example for supporting disaster recovery. An enterprise 501 is shown comprising a plurality of enterprise virtual machines 402a with virtual data stores 402b. Each virtual machine 402a comprises a software solution 403 and each virtual data store 402b comprises data 404 stored therein relating to the software solution 403. Of course a single system optionally includes multiple software solutions and datasets. The enterprise 501 is coupled via a WAN in the form of Internet 305 to a cloud processing provider 511. The cloud processing provider comprises a plurality of virtual machines 312a and virtual storage solutions 312b. Here, there is a different virtual machine 312a corresponding to each virtual machine 402a. Data for each virtual machine 312a and the image of virtual machine itself is stored within the virtual storage solutions 312b, which is storage within the cloud. Unfortunately, the cloud storage is not necessarily within a specific machine or system and, therefore, unlike the duplicate servers of the prior art has no guarantee of security that is easily verifiable and enforceable.

Therefore, for the virtual machines 312a, at least a further virtual machine in the form of sNode 531 is defined which is interposed between the virtual machine and the virtual storage 312b to provide cryptographic functions for encrypting the data prior to storage thereof and for decrypting data upon retrieval thereof. Thus, the virtual machine and its data are stored in a secure fashion, secured by virtual machine 531.

The virtual machine 531 is also coupled to virtual machine in the form of wNode 533 which is coupled to the Internet 305 for communicating within the enterprise via a virtual machine in the form of wNode 509 and a virtual machine in the form of sNode 507, both in the form of an enterprise virtual machine, for secure communication with the virtual machine 533.

In use, data results of the virtual machine 402a are provided to the wNode 509. The wNode 509 secures the data and provides same to the wNode 533 which de-secures the data and provides it to the sNode 531 that re-secures the data for storage within the virtual storage 312b. The associated virtual machine 312a optionally executes at intervals or uninterrupted providing access to a fully functional virtual machine with up to date data for replacing the enterprise server system. Unlike prior art approaches, the system is not inefficient as it is only allocated sufficient cycles for backup and testing functionality. That said, the virtual machine is always available in case of a required disaster recovery test. Further, the data within the offsite storage is secured both as a backup and when presently used for recovery.

In an alternative implementation, the data is provided from wNode 533 to a virtual machine 312a from which it is provided to sNode 531 for storage in a secure fashion via the SAN. Thus, decoupling the wNode from the sNode allows for a greater level of routing options for data received from or bound for the enterprise 501. In yet a further embodiment, sNode 531 is a virtual service within a virtual machine. Thus, for example, sNode 531 and wNode 533 could each be a virtual service within a same virtual machine.

Advantageously, virtual machine 312a, if completely decrypted, is a functional duplicate of virtual machine 402a, thereby providing backup and execution functionality, simultaneously. Further, in an embodiment the sNode 531 that stores data in encrypted form and therefore has access to a security key, is not a node in communication with the Internet directly. Preferably, a connection between the virtual machine 531 and virtual machine 533 is point-to-point, for example using vSockets, and other than through a shared switch fabric. Optionally, the wNode 533 serves the encryption key to the sNode, where the encryption key is typically the wrapper key for use in decrypting the wrapped DEK. If the sNode 531 restarts or fails or when another sNode is started to improve load balancing, the newly started sNode retrieves the encryption key from the wNode. When the wNode fails, it then reauthenticates to the wNode 509 which accesses the key manager 350 to retrieve the wrapped DEK or the wrapper key according to the requirements. Alternatively, the wNode 509 maintains a copy of the key for serving wNode 533 when necessary.

In each of the diagrams of FIG. 3, FIG. 4, and FIG. 5, a key manager 350 is shown for accessing and providing a secret key for use in decrypting and encrypting of data stored within cloud based storage. Thus, the DEK and/or the wrapper key is stored securely and accessible via the enterprise to allow the IT department of the enterprise to secure and manage access to the secret key. Though the key manager 350 is shown within the enterprise 501, optionally it is outside the enterprise. Further optionally, wNode 533 accesses the key manager 350 directly for the key data once it is authenticated to wNode 509.

Optionally, the virtual machines 331 and sNode 531 each act to encrypt data from a plurality of virtual machines for a same enterprise. Thus a plurality of virtual machines for performing encryption would be used for a plurality of enterprises within a same cloud based storage enterprise, each such virtual machine for encrypting data from one or more virtual machines. Of course the data is then stored in virtual storage and, as such, need not reside in a single fixed location or within a same storage medium. Alternatively or in conjunction, the virtual machines 331 and sNode 531 are duplicated to support load balancing for a same group of virtual machines from a same enterprise. Duplication of virtual machines and virtual machines in execution in parallel allow for scalability, load balancing, and true transportable multi-tenancy. Alternatively, sNode 531 is implemented as a virtual service within a virtual machine supporting other virtual services, for example a wNode.

Though the virtual machine wNode 509 is shown coupled to the key manager 350, because the virtual node wNode 509 is coupled to the Internet 305, optionally another virtual machine (not shown) is used to access the key manager 350 and is then coupled to virtual machine wNode 509. In any case, the virtual machine coupled to the key manager 350 typically acts to access the secret key or keys and to secure them and provide them to the virtual machine wNode 533 in the cloud which in turn provides them to virtual machine sNode 531 for securing data stored. As the virtual machine sNode 531 is located in an untrusted location, sNode 531 authenticates itself with a trusted system, wNode 509, in order to obtain valid key data for storing and accessing the encrypted data. Optionally, this process comprises three stages: establishing a secure tunnel, sNode 531 validation, and key data provision. Alternatively, when sNode is a virtual service, another authentication method is optionally employed.

To maintain secure communications between the enterprise 501 and the cloud based system 511, a secure encrypted tunnel is established between the enterprise data centre virtual machine, wNode 509, and the cloud virtual machine, wNode 533. Peered virtual machines 509 and 531 optionally authenticate each other via preconfigured certificates. For example, the wNode 509 validates only the fact that the wNode 533 is a genuine application, but not the fact that it is a genuine instance of the application.

wNode 533 generates a unique ID, tied to the physical location where the wNode 533 is in execution. As long as the wNode 533 executes on the same location, the unique ID is preserved/recalculatable. A different unique ID is generated when the wNode 533 executes from a different location. For example, to generate unique IDs, system level values such as a MAC address of the host ESX server, a serial number embedded in every virtual machine, searching for duplicates in execution, and heuristic processes are useful. Alternatively, another method for determining a unique ID is used.

The cloud virtual machine, wNode 533, transmits a validation request to the virtual machine, wNode, 509 via the secure tunnel indicating its unique ID. The wNode 533 validates the unique Id based on the enterprise policy. Part of this policy, a previously validated unique Id is subsequently considered valid. As such, both the fact that the application is genuine, and the application instance is genuine are validated and the peered virtual machines 509 and 533 are trusting of each other.

An encryption key is associated with a logical storage unit. Hence, a single wNode 533 may use several storage keys. As the storage units may move/be cloned between cloud virtual machines 312a, the storage unit id used to identify the storage key is preferably not physically linked to the unique id though it is uniquely associated therewith. For practical reasons, it is preferable that a data encryption key (DEK) does not change for a storage unit. Instead, the storage key is maintained and transmitted in an encrypted fashion, using a wrapper key for securing thereof. A key manager 350 maintains an association between the storage id and the encrypted DEK and a wrapper key used to encrypt the DEK.

The gateway between the key manager 350 and the wNode 533 is wNode 509. As a result of previous operations, wNode 509 has already authenticated wNode 533 and need not do so again. Optionally, wNode 533 is reauthenticated each time it accesses the wrapped DEK or the wrapper key data. When a new storage unit starts up for the first time, the wNode 533 transmits a request to the wNode 509, providing the storage unit's unique ID and requesting at least one of the DEK and the wrapper key data.

The wNode 509, as a trust gatekeeper, validates the <virtual machine uniqueId, storage uniqueId> pair based on the enterprise policies. For a valid pair, the wNode 509 forwards the storage uniqueId to the key manager 350, requesting a new DEK and/or wrapper key data. The key manager 350 generates a new DEK, encrypts it with the current wrapper key, and stores the encrypted DEK in its database. The encrypted DEK, together with the wrapper key, is forwarded to the wNode 509, which forwards this information to the wNode 533.

Hence, wNode 533 has the encrypted DEK, and the wrapper key, which is used to decrypt the encrypted DEK. The DEK is used by sNode 531 to encrypt data for storage within the SAN within the cloud.

The wrapper key expires periodically. As long as a connection between the wNode 533 and the wNode 509 is active, the wNode 533 requests updates of the wrapper key whenever that key expires or alternatively at intervals. Alternatively, a push method for updating the wrapper key is employed.

The wNode 509 transmits a new wrapper key and the existing DEK encrypted with the new wrapper key to wNode 533. Optionally, wNode 533 validates that the DEK is the same in order to verify the wrapper key received.

When wNode 533 boots up after a restart, it retrieves the storage uniqueId and transmits a request to the wNode 509. Once the request is validated, the DEK, encrypted with the current wrapper key, is retrieved from the key manager 350 and transmitted to wNode 533. Alternatively, if the key is still stored by sNode 531, the wNode 533 optionally retrieves the key data from sNode 531. Of course, when sNode and wNode are each virtual services within a same virtual machine, optionally another method of key retrieval is employed.

wNode 533 optionally does not store either the wrapper key, the DEK or the secured DEK in non-volatile memory. When this is the case, the DEK is unavailable once the cloud virtual machine(s) ceases execution, for example once wNode 533 and sNode 531 simultaneously terminate or restart. After bootup, wNode 533 retrieves a <wrapped DEK, wrapper key> pair, which is relied upon since the wrapper key is other than stored in non-volatile memory. In some embodiments, the wrapped DEK is stored in non-volatile memory.

Unknown to the end user, the enterprise, the physical storage is movable within the virtual storage of the cloud services provider or optionally outside the cloud storage of the cloud services provider. There are two methods for moving the physical storage. In a first method, the physical storage is changed while wNode 533 continues to operate or restarts on a same processing system. The term processing system is used to denote one or more processors of a same cloud service provider, though in some situations a specific processor or computer is indicated. In such a situation, as the data within the storage is secured, nothing needs to change within the cloud and either the virtual machine 509 or the key server 350 provides key data, for example a DEK, wrapper key pair, for decrypting the data from the new storage medium when accessed. In a second method, the virtual machine and its storage are both moved. In such a situation, the virtual machine 309 is tasked with verifying that the virtual machine that has been moved is a correct instantiation of the virtual machine and whether or not to provide the virtual machine that has been moved with the key data.

In practice, a process similar to the boot-up process described above is optionally used. The <vNode uniqueId, storage uniqueId> pair is new, and it is validated based on administrative policies. However, once the pair is validated, the DEK and the wrapper key are identified by the key manager 350 based on the storage uniqueId and transmitted to the new cloud virtual machine.

When copying of the physical storage unit to be used by a different virtual machine, for example in parallel with the original wNode 533, a same storage Id is maintained. Hence, the process of obtaining the wrapped DEK and the wrapper key from wNode 509 is similar to the case of moving virtual machines and/or storage. Of course, when multiple storage devices are consolidated onto a single physical storage device, this adds a layer of complexity that is addressable in a number of ways. For example, the physical storage medium is partitioned. Alternatively, the storage medium is virtualized and the virtual machine execution is used to determine the wrapped DEK. Further alternatively, the wrapped DEK is mapped using the table such that a vNode uniqueId is determinative of the wrapped DEK.

Policy implementation in a data centre virtual machine 509 permits or denies parallel usages of a same storage ID from same virtual machines and from different virtual machines.

If the data centre connection is inactive, for example due to failure, a newly started wNode 533 likely can not retrieve the DEK and the wrapper key from the wNode 509 due to authentication requirements unless the authentication requirements are met. There are several processes that are implementable to allow for disaster recovery—the new virtual machine to take over where a failed virtual machine left off. For example, the newly executed virtual machine is authenticated manually by IT personnel; providing virtual machine high availability such that the backup virtual machine or virtual machines are already in execution and operation in a standby mode—a backup mode—awaiting a failure; and redundant data centre virtual machine infrastructure where the infrastructure is duplicated in a secure fashion to support a same operation of the duplicate data centre upon main data centre failure.

Due to the nature of virtualising data and virtual machines, where typically the virtualized data comprises an image of the virtual machine itself, the issue of preventing unauthorized versions of a virtual machine from being executed is a significant concern so, presently, the system is implemented using manual intervention upon system failure allowing an operator to verify a newly executed virtual machine. Hence, the operator provides authorization of the newly executed virtual machine or provides information to the newly executed virtual machine via a management interface to allow access to the DEK.

An example of a method for providing information comprises the following steps: An administrator retrieves a storageId from the vNode 533 or from the vNode 531. Using this storageId, the administrator retrieves the encrypted DEK, wrapper key data—from the key manager 350. Optionally, the wrapper key is known as an enterprise secret. The administrator then provides the encrypted DEK and the wrapper key to wNode 509 for provision to wNode 533.

Figure 6:
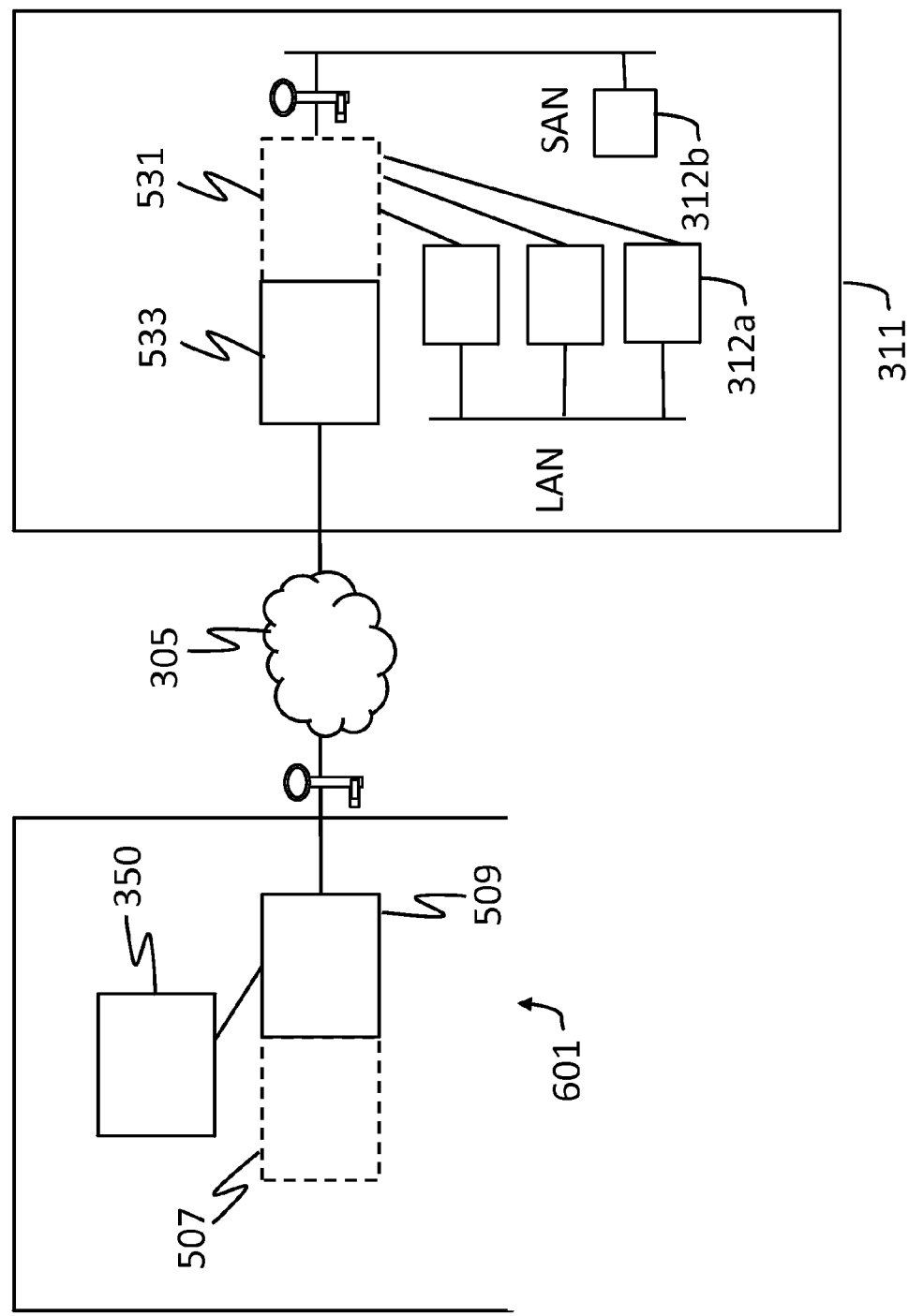
FIG. 6 is another simplified block diagram of a network secure storage.

Referring to FIG. 6, shown is another embodiment used other than for disaster recovery. Here, the enterprise 601 does not include virtual machines for being backed up. The servers of the enterprise 601 are virtualized with cloud services provider 311. Similar to the embodiment of FIG. 5, data is transported between the wNodes 509 and 533 in a secure fashion and all enterprise data is secured by sNode 531 within the SAN. As such secure multitenancy is achieved wherein an administrator of cloud services provider through maliciousness, error, or incompetence cannot accidently publish all of the data of enterprise 601 in a plain text form and, since the data is encrypted, even if access is accidently or otherwise permitted, one accessing the data would have little value in it without access to the DEK and wrapper key data. Thus, the enterprise 601 maintains control over their own data security. In an alternative embodiment, at least one of the wNode and sNode are implemented as virtual services within a virtual machine.

The embodiments presented are exemplary only and persons skilled in the art would appreciate that variations to the embodiments described above may be made without departing from the spirit of the invention. The scope of the invention is solely defined by the appended claims.

What is claimed is:
1. A method comprising:
providing a first virtual machine in execution;
providing a storage area network for storing of data of the first virtual machine; and
providing a second virtual machine for receiving first data from the first virtual machine for storage within the storage area network and for securing the first data to form secured first data and for storing the secured first data within the storage area network,
wherein the second virtual machine encrypts the first data using an encryption key data provided by an enterprise, the enterprise a same enterprise for whom the first virtual machine is in execution,
wherein the first virtual machine is in execution exclusively for the same enterprise,
wherein the encryption key data is provided from a key manager, and
wherein the second virtual machine is authenticated to a process in execution within the enterprise prior to receiving the encryption key data and wherein the process within the enterprise requests the encryption key data from the key manager for provision to the second virtual machine.
2. A method according to claim 1 comprising providing a third virtual machine for maintaining a secure communica- tion with the enterprise, the third virtual machine for being authenticated to the process in execution within the enterprise.

3. A method according to claim 2 wherein the second virtual machine and the third virtual machine being authenticated comprises a process requiring manual provision of authentication data.

4. A method according to claim 2 wherein the second virtual machine and the third virtual machine being authenticated comprises an automated virtual machine authentication method.

5. A method according to claim 2 wherein the third virtual machine comprises a wNode and wherein the second virtual machine comprises an sNode.

6. A method according to claim 1 wherein the second virtual machine forms part of a disaster recovery system.

7. A method according to claim 6 comprising providing a fourth virtual machine for execution within the enterprise, the fourth virtual machine for performing an identical function to the first virtual machine, the first virtual machine for, upon failure of the fourth virtual machine, performing said function.

8. A method according to claim 1 comprising:
providing a third virtual machine for receiving data from the enterprise and for providing the data to the first virtual machine for provision to the second virtual machine.

9. A method according to claim 1 comprising:
providing a third virtual machine for receiving data from the enterprise and for providing the data to the first virtual machine for processing thereof.

10. A method according to claim 1 wherein the second virtual machine forms part of a capacity planning system.

11. A method comprising:
providing a first virtual service in execution;
providing a storage area network for storing of data of the first virtual service; and
providing a second virtual service for receiving first data from the first virtual service for storage within the storage area network and for securing the first data to form secured first data and for storing the secured first data within the storage area network,
wherein the second virtual service encrypts the first data using an encryption key data provided by an enterprise, the enterprise a same enterprise for whom the first virtual service is in execution,
wherein the first virtual service is in execution exclusively for the same enterprise,
wherein the encryption key data is provided from a key manager, and
wherein the second virtual service is authenticated to a process in execution within the enterprise prior to receiving the encryption key data and wherein the process within the enterprise requests the encryption key data from the key manager for provision to the second virtual service.

12. A method according to claim 11 wherein the second virtual service forms part of a disaster recovery system.

13. A method according to claim 11 comprising:
providing a third virtual service for receiving data from the enterprise and for providing the data to the first virtual service for provision to the second virtual service.

14. A method according to claim 11 comprising:
providing a third virtual service for receiving data from the enterprise and for providing the data to the first virtual service for processing thereof.

15. A method according to claim 11 wherein the first virtual service is for execution within a first virtual machine and the second virtual service is for execution within a second other virtual machine.

16. A method comprising:
providing a first virtual service in execution;
providing a storage area network for storing of data of the first virtual service; and
providing a second virtual service for receiving first data from the first virtual service for storage within the storage area network and for securing the first data to form secured first data and for storing the secured first data within the storage area network,
wherein the second virtual service encrypts the first data using an encryption key data provided by an enterprise, the enterprise a same enterprise for whom the first virtual service is in execution,
wherein the first virtual service is in execution exclusively for the same enterprise, and comprising a third virtual service for maintaining a secure communication with the enterprise, the third virtual service for being authenticated to the process in execution within the enterprise.

17. A method according to claim 16 wherein the second virtual service and the third virtual service being authenticated comprises a process requiring manual provision of authentication data.

18. A method according to claim 16 wherein the second virtual service and the third virtual service being authenticated comprises an automated virtual machine authentication method.

19. A method according to claim 16 wherein the third virtual service comprises a wNode and wherein the second virtual service comprises an sNode.

20. A method according to claim 16 comprising providing a fourth virtual service for execution within the enterprise, the fourth virtual service for performing an identical function to the first virtual service, the first virtual service for, upon failure of the fourth virtual service, performing said function.

21. A method according to claim 16 wherein the first virtual service is for execution within a first virtual machine and the second virtual service is for execution within a second other virtual machine.

* * * * *